United States Patent [19]

Louthan et al.

[11] 4,113,707

[45] Sep. 12, 1978

[54] POLY(OXYALKYLENE)-POLYESTER-POLY(SULFIDE)-POLYTHIOL PREPARED BY ESTER INTERCHANGE

[75] Inventors: Rector P. Louthan; Richard C. Doss, both of Bartlesville, Okla.

[73] Assignee: Phillips Petroleum Company, Bartlesville, Okla.

[21] Appl. No.: 737,948

[22] Filed: Nov. 2, 1976

Related U.S. Application Data

[63] Continuation-in-part of Ser. No. 720,474, Sep. 3, 1976, abandoned.

[51] Int. Cl.$^2$ .............................................. C08G 63/68
[52] U.S. Cl. ................................... 528/279; 560/152; 560/154; 528/293
[58] Field of Search .................. 260/76, 75 S; 560/152, 560/154

[56] References Cited

U.S. PATENT DOCUMENTS

| | | | |
|---|---|---|---|
| 3,817,936 | 6/1974 | Jones et al. | 260/76 |
| 3,829,526 | 8/1974 | Doss et al. | 260/75 S |
| 3,850,886 | 11/1974 | Doss | 260/76 |
| 3,931,078 | 1/1976 | Marrs et al. | 260/28 |

FOREIGN PATENT DOCUMENTS 40-15,170   1965   Japan

OTHER PUBLICATIONS

Korshak et al., *Polyesters*, Pergamon Press, London, England, (1965), pp. 13 & 14.
Roeser, *Chemical Abstracts*, vol. 59:126b, (1963).

*Primary Examiner*—Walter C. Danison

[57] ABSTRACT

Poly(oxyalkylene)-polyester-poly(sulfide)-polythiol is prepared by ester interchange between an alkyl mercaptocarboxylate/dialkyl thiodicarboxylate mixture and a poly(oxyalkylene)-polyol. The resulting polymer is a liquid material having more than two, preferably at least three pendant thiol groups. This polymer exhibits exceptional stability and is well suited for sealant applications.

26 Claims, No Drawings

POLY(OXYALKYLENE)-POLYESTER-POLY(SULFIDE)-POLYTHIOL PREPARED BY ESTER INTERCHANGE

CROSS REFERENCE TO RELATED APPLICATION

This is a continuation-in-part of copending application Ser. No. 720,474, filed Sept. 3, 1976 now abandoned.

BACKGROUND OF THE INVENTION

This invention relates to poly(oxyalkylene)-polyester-poly(sulfide)-polythiols. Poly(oxyalkylene)-polyester-poly(sulfide)-polythiols are broadly known as shown by U.S. Pat. No. 3,817,936. These materials are quite useful in applications such as sealants. The compositions are normally liquid and can be easily cured with conventional curing agents such as sulfur to give a weather resistant flexible cured sealant. However, the production of such sealants is rather difficult requiring corrosion-resistant equipment such as glass-lined reactors and the resulting product requires stabilization to avoid gelling on storage.

SUMMARY OF THE INVENTION

It is an object of this invention to provide a method of making poly(oxyalkylene)-polyester-poly(sulfide)-polythiols which are stable enough to be stored without the use of stabilizers;

it is a further object of this invention to produce polymer having an acid number of less than 0.01, preferably 0.00;

it is a further object of this invention to avoid the necessity for glass-lined reaction equipment; and it is a further object of this invention to provide a simplified method of producing poly(oxyalkylene)-polyester-poly(sulfide)-polythiols.

In accordance with this invention a mixture of an alkyl mercaptocarboxylate and a dialkyl thiodicarboxylate or dialkyl polythiodicarboxylate is reacted with a poly(oxyalkylene)-polyol to give a poly(oxyalkylene)-polyester-poly(sulfide)-polythiol having good stability.

DESCRIPTION OF THE PREFERRED EMBODIMENTS

This invention pertains to the preparation of a poly(oxyalkylene)-polyester-poly(sulfide)-polythiol having more than two pendant thiol groups per molecule. The resulting polymers are liquid at room temperature and generally have a viscosity at 25° C. within the range of 3,000 to 10,000 preferably 5,000 to 8,000 centipoises. In one embodiment a mixture of at least one alkyl mercaptocarboxylate and at least one dialkyl thiodicarboxylate is transesterified in the presence of a transesterification catalyst with a poly(oxyalkylene)-polyol having more than two hydroxy groups per molecule to give said poly(oxyalkylene)-polyester-poly(sulfide)-polythiol. In another embodiment hydrogen sulfide reacts with at least one olefinically unsaturated alkyl carboxylate in the presence of an addition catalyst to give a mixture of at least one alkyl mercaptocarboxylate and at least one dialkyl thiodicarboxylate or dialkyl polythiodicarboxylate which mixture is then transesterified in the presence of a transesterification catalyst with a poly(oxyalkylene)-polyol having more than two hydroxy groups per molecule to give a poly(oxyalkylene)-polyester-poly(sulfide)-polythiol. In still another embodiment hydrogen sulfide reacts with at least one olefinically unsaturated alkyl carboxylate in the presence or absence of an addition catalyst to give a mixture of at least one alkyl mercaptocarboxylate and at least one dialkyl thiodicarboxylate or dialkyl polythiodicarboxylate, which mixture is subsequently separated into the individual components, which individual components are subsequently mixed in appropriate proportions and transesterified in the presence of a transesterification catalyst with a poly(oxyalkylene)-polyol having more than two hydroxy groups per molecule to give a poly(oxyalkylene)-polyester-poly(sulfide)-polythiol.

The poly(oxyalkylene)-polyester-poly(sulfide)-polythiol of this invention is readily oxidatively coupled or cured in an appropriate formulation to form a cured or coupled composition which is useful, e.g., as a sealant. The sealant comprises the poly(oxyalkylene)-polyester-poly(sulfide)-polythiol, a filler and a curing agent. The filler generally comprises an inert inorganic filler and a pigment, either inorganic or organic. Other materials may be present such as cure modifiers, plasticizers, extender, stabilizers, modifiers, adhesion promoters, and the like. Generally the sealant will contain 10–99, preferably 25 to 75 percent of weight of the poly(oxyalkylene)-polyester-poly(sulfide)-polythiol, and the remainder non-elastomeric ingredients as set out hereinabove.

The poly(oxyalkylene)-polyester-poly(sulfide)-polythiols of this invention can be cured in a sealant formulation with conventional curing agents including free oxygen-containing fluids such as, for example, air; organic peroxide and hydroperoxides such as, for example, di-tert-butyl peroxide and cumene hydroperoxide; metal oxides such as, for example, the oxides of lead, zinc, manganese, calcium, barium, copper, mercury, tin and iron; metal salts of carboxylic acids such as, for example, lead stearate, zinc laurate, zinc acetate; ammonium persulfate; sulfur; and the like. The curing time will vary with the polymer, the curing agent, the sealant formulation, and the temperature. In general, sufficient curing agent is employed to convert at least about 70 percent of the pendant thiol groups to polysulfide groups.

The term poly(oxyalkylene)-polyester-poly(sulfide)-polythiol is meant to be generic to both poly(oxyalkylene)-polyester-poly(monosulfide)-polythiol and poly(oxyalkylene)-polyester-poly(monosulfide)-poly(disulfide)-polythiol, or other polymers produced from reactants wherein part of the

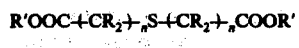

is replaced with

wherein $q$ is an integer from 2 to 5 preferably 2. Generically, then the dicarboxylate can be represented by

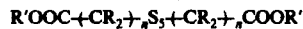

wherein $r$ is an integer from 1 to 5, preferably 1 or 2, and mixtures thereof, R and R' and $n$ in each case being as defined hereinbelow.

Embodiment I

In this embodiment a mixture of at least one alkyl mercaptocarboxylate and at least one dialkyl thiodicarboxylate is treated in the presence of a transesterification catalyst with a poly(oxyalkylene)-polyol having more than two hydroxy groups per molecule to give a poly(oxyalkylene)-polyester-poly(monosulfide)-polythiol having more than two pendant mercaptan groups per polymer molecule.

Alkyl mercaptocarboxylates which are useful in this invention are represented by formula I:

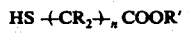

wherein R' is an alkyl radical containing from 1 to 5 carbon atoms, wherein R is hydrogen or R', wherein $n$ is an integer having a value of from 1 to 5 and wherein formula I contains a maximum of 15 carbon atoms in all R groups per molecule.

Examples of useful alkyl mercaptocarboxylates include methyl mercaptoacetate, methyl 2-mercaptopropionate, methyl 3-mercaptopropionate, ethyl 4-mercaptobutyrate, n-butyl 6-mercaptohexanoate, isopropyl 6-mercaptoundecanoate, n-pentyl 6-mercapto-2-(2,2-dimethylpropyl)undecanoate, t-butyl 2-mercapto-2-methylheptanoate, methyl 3,3-dimethyl-6-mercaptohexanoate, n-propyl 6-mercapto-2,2,3,3,4,4,5,5,6-nonamethylheptanoate and the like.

Dialkyl thiodicarboxylates which can be employed according to the process of this invention are represented by formula II:

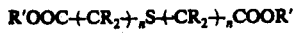

wherein R,R' and $n$ are as defined above; with a total of no more than 30 carbon atoms for all R groups in a molecule.

Specific examples of useful dialkyl thiodicarboxylates include dimethyl thiodiacetate, dimethyl 3,3'-thiodipropionate, diethyl 4,4'-thiodibutyrate, di-n-butyl 6,6'-thiodihexanoate, diisopropyl 6,6'-thiodiundecanoate, di-n-pentyl 6,6'-thiobis[2-(2,2-dimethylpropyl)undecanoate], di-t-butyl 2,2'-thiobis(2-methylheptanoate), dimethyl 6,6'-thiobis(3,3-dimethylhexanoate), di-n-propyl 6,6'-thiobis(2,2,3,3,4,4,5,5,6-nonamethylheptanoate), dimethyl ester of 3-[(carboxymethyl)thio]propionic acid, and the like.

The poly(oxyalkylene)-polyols or polyhydroxy polyethers employed according to the invention have on average more than two and generally at least on the average 2.5, preferably at least three, pendant hydroxy groups per molecule. Such polyhydroxy polyethers or poly(oxyalkylene)-polyols have more than two, preferably three to about 12, hydroxyl groups per molecule and molecular weights of from about 200 to about 20,000. These materials can be produced by the reaction of one or more epoxy-substituted hydrocarbons of the general formulas

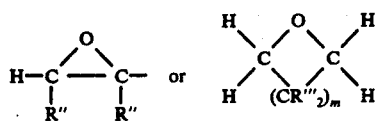

with a polyol of the general formula

wherein either R" can be H or alkyl with the total number of carbon atoms in the molecule being in the range of up to and including about 20; wherein R''' can be alkyl or H with the total number of carbon atoms per molecule being in the range of up to and including about 20; and wherein $m$ can be an integer of from 1 to about 10, preferably 1 to 3; and wherein Y can be a hydrocarbon moiety with at least two and ordinarily from 3 to 40 carbon atoms per moiety and a valence equal to the value of $x$, $x$ being an integer of at least two and ordinarily from 3 to about 20, and the number of carbon atoms per molecule of $Y(OH)_x$ is equal to or greater than $x$.

Polyols that are employed in the preparation of the poly(oxyalkylene)-polyols or polyhydroxy polyethers used in this invention comprise hydroxy-substituted hydrocarbons that are preferably saturated aliphatics, saturated cycloaliphatics, aryls, or combinations thereof that are substituted with more than two and preferably at least three hydroxyl groups per molecule. In the presently preferred embodiment of this invention, these polyols $Y(OH)_x$ can have from two up to about 12 hydroxyl groups per molecule, and can contain from 3 to about 20 carbon atoms per molecule. Illustrative of the polyols useful in this invention that can be represented by the general formula $Y(OH)_x$ are ethylene glycol, 1,3-propanediol, 2-butene-1,4-diol, 1,4-cyclohexanediol, 2-ethylhexane-1,3-diol, glycerine, pentaerythritol, erythritol, 1,3,8-trihydroxycyclododecane, estriol, 1,4,5,8-naphthalenetetrol, di(p-hydroxyphenyl) phenyl methanol, 1,2,6-hexanetriol, 1,2,4,6,7,9,12,14,15,17,19,20-eicosanedodecol, and the like.

The poly(oxyalkylene)-polyols or polyhydroxy polyethers of this invention can be prepared by contacting at least one polyol of the formula $Y(OH)_x$ as defined above, with an epoxy-substituted hydrocarbon, as defined above, under suitable polymerization conditions, as is known to the art. For instance, glycerine can be contacted with an excess of propylene oxide (1,2-epoxypropane) under elevated pressure and in the presence of suitable polymerization promoters. Products of this type can also be obtained from commercial sources. Niax Polyol LHT-67 (a trademark) is a commercial product of this type. In the preparation of poly(oxyalkylene)-polyols having on average more than two pendant hydroxyl groups per molecule, mixtures of the above polyols such as at least one diol and another polyol can be reacted with the epoxy-substituted hydrocarbons defined above to form poly(oxyalkylene)-polyols having more than two pendant hydroxy groups on average per molecule. For instance, a mixture of 1,4-butanediol and 1,2,6-hexanetriol can be reacted with ethylene oxide to produce a poly(oxyethylene)-polyol having an average of more than two pendant hydroxy groups per molecule. Alternatively, a poly(oxyalkylene)-polyol produced, e.g. by the reaction of a diol such as ethylene glycol with an alkylene oxide such as propylene oxide, can be mixed with another poly(oxyalkylene)-polyol produced, e.g. by the reaction of a triol such as 1,2,6-hexanetriol with an alkylene oxide such as propylene oxide. As yet another alternative, up to about 30 weight percent of the poly(oxyalkylene)-polyol can be replaced with a polyol having recurring ester linkages, e.g., an average of about 2 to about 5 ester linkages per molecule, in place of at least a portion of the ether linkages, produced, e.g., by reaction of a lactone such as caprolactone with a polyol such as ethylene glycol or with an alkylene oxide-polyol condensation product such as diethylene glycol.

Illustrative examples of the epoxy-substituted hydrocarbons of the above-defined formulas that can be employed with the polyols to form the poly(oxyalkylene)-polyol include 1,2-epoxypropane, 1,2-epoxyethane, 1,2-epoxydocosane, 10,11-epoxydocosane, 2,3-epoxy-4,5-dimethyldodecane, 1,3-epoxypropane, 1,12-epoxydodecane, 1,12-epoxy-2,11-dibutyldodecane, 1,4-epoxy-2-(2,2-dimethyltetradecyl)-butane, and the like.

Transesterification catalysts useful in this invention for the transesterification of the mixture of alkyl mercaptocarboxylate and dialkyl thiodicarboxylate with poly(oxyalkylene)-polyols include those of formula III

$$M(OR'''')_4 \qquad (III)$$

wherein R'''' is an alkyl group having from 1 to 10 carbon atoms and M is titanium or zirconium. It is presently preferred to employ tetraalkyl titanates of formula III wherein M is titanium and the R'''' groups contain from 3 to 8 carbon atoms per group.

Mixtures of alkyl mercaptocarboxylates and dialkyl thiodicarboxylates useful in this invention will generally contain from 5 to 95 weight percent alkyl mercaptocarboxylate. However, it is preferred to employ mixtures containing from 50 to 75 weight percent alkyl mercaptocarboxylate.

It may also occasionally be desirable to have present in the mixture of alkyl mercaptocarboxylate and dialkyl thiodicarboxylate a small amount of dialkyl dithiodicarboxylate. Such mixtures are within the scope of this invention.

In order to improve the efficiency of the transesterification reaction it is frequently desirable to exclude materials which are detrimental to the reaction. For example, water is detrimental to the reaction and can be excluded by means well-known in the art such as by purging the poly(oxyalkylene)-polyol at elevated temperature prior to use with a dry, inert gas.

It is currently convenient to run the transesterification reaction in the absence of diluent. However, if desired, inert diluents may be employed. Such diluents include the well-known saturated aliphatic, saturated cycloaliphatic or aromatic hydrocarbons containing from 5 to 8 carbon atoms such as pentane, hexane, isooctane, cyclohexane, benzene, toluene and the xylenes; as well as the well-known acyclic or cyclic ethers containing from 4 to 8 carbon atoms such as diethyl ether, di-n-butyl ether, tetrahydrofuran and p-dioxane; as well as mixtures thereof.

In the practice of this embodiment of the invention it is convenient to employ the mixed esters (alkyl mercaptocarboxylate and dialkyl thiodicarboxylate) and poly(oxyalkylene)-polyol in amounts ranging from 0.8 to 1.2 equivalents of ester group in the mixed esters per equivalent of hydroxy group in the poly(oxyalkylene)-polyol, preferably from 1.0 to 1.1, more preferably 1.04 to 1.07, equivalents of ester per equivalent of hydroxy. The transesterification catalyst is generally employed in an amount ranging from 0.1 to 4 and preferably 0.2 to 2 grams of catalyst per gram equivalent of hydroxy groups in the poly(oxyalkylene)-polyol.

The transesterification reaction to produce the poly(oxyalkylene)-polyester-poly(monosulfide)-polythiol of this invention is normally carried out at a temperature in the range of 125° to 235° C and preferably from 165° to 225° C for a time period in the range of 0.5 to 72 hours and preferably from 6 to 30 hours. The pressure under which the transesterification reaction occurs can be whatever is convenient depending on temperature and volatility of reaction components such as from subatmospheric to superatmospheric. For example, reaction pressures can range from 0.1 to 100 atmospheres, but those from 1 atmosphere to 10 atmospheres are preferred.

Conditions of temperature and pressure are chosen to provide for the continuous removal overhead of R'OH during the course of the transesterification. One skilled in the art will recognize that the continuous removal of a lower alcohol from a transesterification reaction system provides the driving force for the transesterification to occur to a high degree. If, however, one desires a lower degree of transesterification, e.g., the equilibrium value, then removal of the alcohol overhead will not be necessary.

It is currently preferred to run the transesterification reaction in the absence of diluent, with appropriate amounts of reactants and under suitable conditions of time, temperature and pressure such that the completion of the transesterification reaction as evidenced by the cessation of evolution of R'OH, the poly(oxyalkylene)-polyester-poly(monosulfide)-polythiol will require no further treatment or working prior to use. If, however, further purification or treatment of the product is desired, then well-known art procedures such as washing, solvent extraction, etc., may be employed to provide product with the desired degree of purity.

Embodiment II

It is frequently desirable to employ a process for the preparation of poly(oxyalkylene)-polyester-poly(sulfide)-polythiol in which the alkyl mercaptocarboxylate and dialkyl thiodicarboxylate employed in Embodiment I are prepared together in a mixture of proper proportions such that the transesterification step can be run directly on the reaction product (mixture of esters) without prior isolation of the esters and without prior combination of the esters in proper proportions.

This embodiment of the invention is carried out by employing the reaction of hydrogen sulfide in the presence of an addition catalyst with an olefinically unsaturated alkyl carboxylate to give a mixture of alkyl mercaptocarboxylate and dialkyl thiodicarboxylate which is of proper proportions such that it can be employed directly in the transesterification reaction described in Embodiment I.

The olefinically unsaturated alkyl carboxylates useful in this embodiment of the invention are those of formula IV

$$CR_2 = CR-(CR_2)_p CO_2R' \qquad (IV)$$

wherein R and R' are as described above and p is zero or an integer having the value of 1, 2 or 3 and wherein the total number of carbon atoms in all of the R groups is up to 15 carbon atoms per molecule.

Specific examples of useful compounds of formula IV include methyl acrylate, ethyl acrylate, methyl methacrylate, ethyl 3-butenoate, n-butyl 5-hexenoate, isopropyl 5-undecenoate, n-pentyl 2-(2,2-dimethylpropyl)-5-undecenoate, t-butyl 2-methyl-2-heptenoate, methyl 3,3-dimethyl-5-hexenoate, n-propyl 2,2,3,3,4,4,5-heptamethyl-5-heptenoate and the like.

Though it is possible to effect the desired reaction of hydrogen sulfide and olefinically unsaturated alkyl carboxylate in the absence of catalyst it is highly preferred to employ an addition catalyst to facilitate the reaction. Useful addition catalysts include well-known organic and inorganic bases such as sodium hydroxide, potassium hydroxide, sodium methoxide, ammonia, ammonium hydroxide, dimethylamine, triethylamine, N,N-diethylaniline, pyridine, 3-ethyl-4-methylpyridine and the like. Ammonium hydroxide is presently preferred.

It is frequently desirable to include sulfur and/or water as a cocatalyst in the reaction of hydrogen sulfide with olefinically unsaturated alkyl carboxylate when using an alcohol diluent. Sulfur particularly in combination with water has been found to greatly increase the proportion of alkyl mercaptocarboxylate to dialkyl thiodicarboxylate. In the absence of sulfur and/or water the desired high proportion of alkyl mercaptocarboxylate is not formed even in the presence of an excess of $H_2S$, although varying the ratio of hydrogen sulfide in the reaction does give some change in the proportion of alkyl mercaptocarboxylate formed. Thus by using sulfur and/or water to substantially increase the amount of alkyl mercaptocarboxylate formed and then varying the amount of hydrogen sulfide used, the reaction can be fine tuned to give the exact proportion desired.

The addition of hydrogen sulfide to olefinically unsaturated alkyl ester can be carried out in the presence or absence of diluents. It is currently preferred to employ diluents consisting of: lower alcohols of formula R'OH wherein R' is as above-described; saturated aliphatic, saturated cycloaliphatic or aromatic hydrocarbons containing 5 to 8 carbon atoms; or cyclic acyclic acylic ethers containing from 4 to 8 carbon atoms. Exemplary diluents include methanol, ethanol, isopropanol, pentane, hexane, isooctane, cyclohexane, benzene, toluene, the xylenes, diethyl ether, di-n-butyl ether, tetrahydrofuran and p-dioxane. The alcohols are currently preferred as diluents and methanol is the most preferred alcohol. The alcohol will generally be used in an amount within the range of 1–50 preferably 5–25 weight percent based on the total weight of hydrogen sulfide, alkyl ester and alcohol. More can be used if desired as an excess has no particular detrimental effect, so long as at least about 1 percent is used.

The addition of hydrogen sulfide to olefinically unsaturated alkyl ester is conducted under whatever conditions of temperature, pressure and time are desirable to achieve the desired results. Temperatures in the range of 25° to 150° C are generally useful for the reaction; however, due to the frequently exothermic nature of the reaction, it may be desirable to provide external cooling capability to the reactor. Pressures which are useful in this reaction are generally in the range of 200 to 2000 psig (1350 to 13,500 kPa) and preferably in the range of 200 to 500 psig (1350 to 3450 kPa). Reaction times of 1 minute to 24 hours are generally useful, but a period of 30 minutes to 5 hours is preferable.

Hydrogen sulfide and olefinically unsaturated alkyl ester are generally employed in amounts ranging from 0.5 to 10 moles hydrogen sulfide per mole of unsaturated ester and preferably in amounts ranging from 1 to 3 moles $H_2S$ per mole of ester.

Any amount of diluent may be employed in the addition reaction which produces the desired results. It is preferable to use 0.3 to 1 part by weight diluent per part by weight unsaturated ester.

Effective amounts of catalyst are usually in the range of 0.0001 to 0.1 part by weight catalyst per part by weight unsaturated ester, but any effective amount can be used. A preferred range of catalyst amount is 0.001 to 0.05 part by weight catalyst per part by weight unsaturated ester.

Sulfur is generally employed in the addition reaction in amounts ranging from 0.0001 to 0.1, preferably 0.001 to 0.05 part by weight sulfur per part by weight ester. Water is generally employed in the addition reaction in amounts ranging from 0.0001 to 0.2, preferably 0.004 to 0.1 parts by weight per part by weight of ester.

Following the addition of the hydrogen sulfide to the olefinically unsaturated alkyl ester it is desirable to remove the volatile diluent, unreacted starting materials and volatile by-products. This is readily accomplished by flashing the undesired volatile components of the reaction mixture. The resulting residue, a mixture containing predominantly alkyl mercaptocarboxylate and dialkyl thiodicarboxylate with a small portion of dialkyl dithiodicarboxylate, is then used directly for the transesterification reaction.

The transesterification reaction involved in this embodiment of the invention is carried out as described in Embodiment I with the same amounts of materials and reaction conditions employed.

The presence of sulfur in the cocatalyst, in addition to giving a higher proportion of alkyl mercaptocarboxylate also produces some

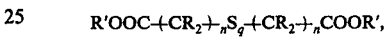

$$R'OOC+CR_2+_nS_q+CR_2+_nCOOR',$$

thus operation in accordance with the feature of Embodiment II wherein sulfur is used in the reaction of the hydrogen sulfide with the olefinically unsaturated alkyl carboxylate gives some poly(oxyalkylene)-polyester-poly(monosulfide)-poly(disulfide)-polythiol, poly(oxyalkylene)-polyester-poly(monosulfide)-poly(disulfide)-poly(trisulfide)-polythiol, etc.

Embodiment III

In Embodiment II the addition reaction product containing the desired proportion of alkyl mercaptocarboxylate to dialkyl thiodicarboxylate obtained by regulating the course of the addition reaction was utilized directly in the transesterification reaction. It is frequently desirable to either avoid the careful control of the addition reaction necessary to obtain the desired proportion of esters in the reaction product or to control the proportions of the mixed esters for the transesterification reaction more precisely than is possible employing Embodiment II. If such is desired, Embodiment III of the invention provides the desired results.

According to Embodiment III a mixture of alkyl mercaptocarboxylate and dialkyl thiodicarboxylate is prepared as generally described in Embodiment II except that care need not be taken to obtain precisely the proportion of mercaptoester and thiodiester in the reaction product which is desired in the subsequent transesterification reaction. In this embodiment the reaction product mixture resulting from the addition reaction of hydrogen sulfide to the olefinically unsaturated alkyl ester is fractionally distilled to obtain fractions enriched in either alkyl mercaptocarboxylate or dialkyl thiodicarboxylates. Appropriate amounts of the resulting fractions are then combined to provide a mixture containing precisely the desired proportion of alkyl mercaptocarboxylate and dialkyl thiodicarboxylate for the subsequent transesterification reaction.

Amounts of reactants, catalyst, cocatalyst, and diluents, as well as reaction conditions employed in Embodiment II are also applicable to this embodiment of the invention.

As in Embodiment II, if sulfur is used in the production of the mixed esters, poly(oxyalkylene)-polyester-poly(monosulfide)-poly(disulfide)-polythiol can be produced as a result of the presence of a minor amount, usually 2 to 10 weight percent, of the dithiodiester based on the total mixed esters.

The poly(oxyalkylene)-polyester-poly(sulfide)-polythiol prepared according to the embodiments of this invention can be used immediately after preparation or can be stored for a period of time prior to use. They are useful in a variety of sealant and coating formulations such as those described fully in U.S. Pat. Nos. 3,803,089, 3,817,936, 3,829,526, 3,843,381, 3,857,876, 3,919,067 and 3,931,078, the disclosures of which are hereby incorporated by reference.

EXAMPLE I

The following run (Run 1) illustrates the preparation of methyl 3-mercaptopropionate and dimethyl thiodipropionate and the preparation of a poly(oxyalkylene)-polyester-poly(sulfide)-polythiol therefrom.

Into a 1-gallon stainless steel reactor fitted with a stirrer, pressure gauge, temperature measuring device and internal cooling coil was placed methanol (600 ml), concentrated ammonium hydroxide (28 weight percent $NH_3$, 21.6 gm), sulfur (12 gm) and hydrogen sulfide (816 gm). Methyl acrylate (1376 gm) was introduced into the stirred reactor over a 45 minute interval. Over the reaction period the temperature of the reaction mixture increased from 23° to 53° C while the pressure decreased from 1650 kPa (240 psig) to 1150 kPa (169 psig). After an additional 30 minute period of stirring the reactor was vented to release excess hydrogen sulfide and the remaining reaction solution was transferred to a fractionation apparatus.

A total of 5 runs were made as described above. The resulting reaction mixtures were combined prior to fractional distillation.

A fraction (5889 gm) was collected over a boiling range of 87°–93° C at 50 torr (mm Hg) pressure which contained 98.6 weight percent methyl 3-mercaptopropionate (analyzed by GLC, i.e., gas-liquid chromatography). The undistilled pot residue (3005 gm) contained 85 weight percent dimethyl thiodipropionate and 15 weight percent dimethyl dithiodipropionate (analyzed by GLC).

Into a 3 liter, stirred, heated glass reactor was added polyether polyol (550 gm of LHT-34 from Union Carbide—derived from 1,2,6-hexanetriol and propylene oxide, having a molecular weight of about 4500 and a hydroxyl number which is the milliequivalents of OH groups per gram of polyol of about 34). Nitrogen (0.056 m³/hr) was bubbled through the stirred reactor and the contents maintained at 100° C for 1 hour to remove residual water. The nitrogen flow was then reduced to 0.0056 m³/hr, a reflux condenser was attached and methyl mercaptopropionate (25.9 gm fraction described above), sulfide-disulfide mixture (14.1 gm—undistilled pot residue described above), and tetrabutyl titanate (0.2 ml, du Pont's Tyzor TBT, essentially 0.2 g pure tetrabutyl titanate) were added to the reactor. The stirred reaction mixture was maintained at 177° C for 24 hours. The nitrogen flow through the reaction mixture swept out the methanol formed in the transesterification reaction. At the end of the 24 hour period, the reflux condenser was removed and the nitrogen flow rate was increased to 0.056 m³/hr with the temperature maintained at 177° C for 1 hour to remove volatiles. The resultant poly(oxyalkylene)-polyester-poly(sulfide)-polythiol possessed 0.88 weight percent mercaptan sulfur and a viscosity of 6800 centipoises at 25° C.

EXAMPLE II

The following run (Run 2) illustrates preparation of a poly(oxyalkylene)-polyester-poly(sulfide)-polythiol employing a methyl mercaptopropionate/dimethyl thiodipropionate/dimethyl dithiodipropionate mixture which was not fractionated after its preparation as was that in Example I.

Methanol, ammonium hydroxide, sulfur and hydrogen sulfide in the same amounts, using the same reactor and the same charging procedure as in Example I were employed. Methyl acrylate (1376 gm) was added to the stirred reactor over a 30 to 40 minute period. Following the methyl acrylate addition there was a 15 minute stirring period. Then the reaction solutions of 6 successive runs were combined and the methanol was distilled. The remaining reaction product containing methylmercaptopropionate, dimethyl thiodipropionate and dimethyl dithiodipropionate in a 67.3/27.8/4.9 weight ratio, respectively, (by GLC) was filtered prior to use in the transesterification reaction.

The transesterification reaction was conducted in a stirred, heated reactor. Polyether polyol (29.5 kg LHT-34) was dried as in Example I. The reflux condenser was attached to the reactor and the nitrogen flow was reduced to 0.006 m³/hr prior to addition of the mercaptan-sulfide-disulfide mixture (2083 gm) prepared above and 10.7 ml (10.6 g) tetrabutyl titanate. After the stirred reaction mixture had been maintained at 177° C for 24 hours the volatiles were stripped as in Example I. The resultant poly(oxyalkylene)-polyester-poly(sulfide)-polythiol possessed 0.83 weight percent mercaptan sulfur and a viscosity of 6600 centipoises at 25° C.

EXAMPLE III

The following runs (Runs 3 and 4) were conducted as described in Example I except that 0.19 g tetraisopropyl titanate (Run 3) and 0.19 g tetraoctyl titanate (Run 4) were employed as transesterification catalysts. The polymer resulting from Run 3 had 0.90 weight percent mercaptan sulfur and a viscosity of 4800 centipoises at 25° C. The Run 4 polymer had 0.90 weight percent mercaptan sulfur and 4800 centipoises viscosity at 25° C. The tetrabutyl titanate of Example I is preferred.

EXAMPLE IV

The following runs illustrate the use of the polymers prepared in Runs 1 through 4 in sealant formulations.

The formulation employed in these runs is given in the following recipe:

| Sealant Formulation | Recipe Parts by Weight |
|---|---|
| Polymer | 20 |
| Chlorinated paraffin[1] | 3 |
| Calcium carbonate | 10 |
| Titanium dioxide | 2 |
| Fumed silica | 1.2 |
| Stabilizer[2] | 0.2 |
| Carbon black | 0.12 |
| Yellow pigment | 0.15 |
| Iron oxide | 0.5 |
| Curing Agent | Parts by Weight |
| Dibutyl phthalate | 0.6 |
| Lead dioxide | 0.6 |

| Recipe | |
|---|---|
| Sealant Formulation | Parts by Weight |
| Water | 0.45 |

1 = Clorafin 50 from Monsanto, a light yellow, viscous oil.
2 = 2,2'-methylenebis(4-methyl-6-t-butylphenol).

After the above sealant formulation was prepared, the curing agent components were added and the resulting sealant was heated at 70° C for 16 hours. Table I gives properties of the resultant cured sealants.

Table I

| Run No. | 5 | 6 | 7 | 8 |
|---|---|---|---|---|
| Polymer run no. | 1 | 2 | 3 | 4 |
| 50% Modulus, psi[1] | 44.3 | 32.5 | 30.5 | 27 |
| Tensile Strength, psi[1] | 162.5 | 126.5 | 113 | 106.5 |
| Elongation, %[1] | 680 | >675 | >700 | >700 |

1 = ASTM D 888-56T

The results in Table I demonstrate that useful sealants were obtained based on the poly(oxyalkylene)-polyester-poly(sulfide)-polythiols prepared according to the practice of this invention.

EXAMPLE V

Poly(oxyalkylene)-polyester-poly(sulfide)-polythiol made in accordance with this invention and poly(oxyalkylene)-polyester-poly(sulfide)-polythiol made by reacting a mercaptoalkanoic acid and a thiodialkanoic acid with a poly(oxyalkylene)-polyol and neutralized as disclosed in said U.S. Pat. No. 3,817,936 were subjected to storage conditions in air for 60 days. The polymer made in accordance with the invention was stable without the introduction of stabilizers as evidenced by essentially no change in viscosity after 60 days whereas the polymer made from the acids exhibited a two to three-fold increase in viscosity after 60 days. As a specific example control polymer having an initial viscosity of about 7000 centipoises at 25° C had a viscosity of greater than 25,000 centipoises at 25° C after 100 days, the increase in viscosity beginning almost immediately after contact with air. The invention polymer was made essentially as set out in Example I, i.e., using sulfur in the preparation of the mixed esters.

Polymers were analyzed to compare the polymer made in accordance with this invention with polymer made in accordance with U.S. Pat. No. 3,817,936. The invention polymer was prepared as in Example VII. The results are as follows:

TABLE II

| Analytical Test | U.S. 3,817,936 | Invention |
|---|---|---|
| SH, Weight % | 0.74 | 0.84 |
| Total Sulfur, Weight % | 1.3 | 1.3 |
| Number Average Mol. Wt.[(1)] | 4616 (±243) | 6171 (±318) |
| Carbon, Weight % | 61.0 | 60.7 |
| Hydrogen, Weight % | 10.2 | 10.3 |
| Nitrogen, Weight % | <0.1 | <0.1 |
| Acid Number, mg/g[(2)] | 0.08 | 0.00 |
| OH Content, meq/g[(3)] | 0.33 | 0.35 |
| Volatiles at 110 C, 1 Hr., Wt. % | 0.27 | 0.08 |
| Ash, Weight % | 0.065 | 0.011 |
| Composition of Ash | $CaSO_4$ | [(4)]$TiO_2$ |
| Number Average Mol. Wt. $(M_N)$[(5)] | 8300 | 8300 |
| Weight Average Mol. Wt. $(M_W)$[(5)] | 26,000 | 24,000 |
| $M_W/M_N$ | 3.2 | 2.9 |

(1) By vapor phase osmometry, VPO, not believed to be accurate at this high molecular weight.
(2) Determined as milligram KOH required to neutralize the acid in one gram of polymer.
(3) Meq of OH groups per gram of polymer. Determined by reacting an excess of acetic anhydride and then hydrolyzing and titrating with standard base.
(4) Confirmed by x-ray diffraction.
(5) By gel permeation chromatography - calibrated with polybutadiene.

Differential infrared spectra indicate the polymer produced in accordance with U.S. Pat. No. 3,817,936 has a greater proportion of ether groups to carbonyl groups than does the invention polymer.

As can be seen, the polymer produced in accordance with the invention has no measurable acid number.

EXAMPLE VI

Numerous runs were carried out preparing polymer in accordance with this invention using a glass-lined vessel for the transesterification of the type used in the preparation of the control polymer of Example V, the preparation of the control polymer not being possible in stainless steel equipment. Stainless steel coupons Type 304 and 316 were placed in this transesterification vessel during the preparation of the invention polymers and after 700 hours they showed no visible sign of corrosion. The control polymer could not be prepared in contact with stainless steel because of corrosion.

EXAMPLE VII

The following pilot plant run was carried out under essentially the same conditions as Example II except scaled up to larger quantities.

Into a 500 gallon glass-lined reactor was placed 300 lbs. of methanol and 13½ lbs. of concentrated ammonium hydroxide (28 weight percent $NH_3$) along with 7½ lbs. of sulfur and about 80 gals. of hydrogen sulfide. Then 108 gals. of methyl acrylate was introduced into the reactor over a 2 hour interval. Over the reaction period the temperature of the reaction mixture increased from 29° to about 48° C. while the pressure decreased from about 2100 kPa (308 psig) to about 1150 kPa (169 psig). After an additional 1 hour reaction time the reactor was vented to release excess hydrogen sulfide after which the top of the reactor was connected with a reflux condenser and the reactor heated to a temperature of about 162° C. to drive off water and methanol. It was then cooled down and the resulting product comprising mixed esters of methyl 3-mercaptopropionate and dimethyl thiodipropionate were placed in holding drums.

About 3,082 lbs. of polyether polyol (LHT-34 from Union Carbide derived from 1,2,6-hexanetriol and propylene oxide having a molecular weight of about 4,500 and a hydroxyl number of about 34) was introduced into the reactor and heated to 121° C. with nitrogen purge for 1 hour to strip out water. Then 225 lbs. of the mixed esters was introduced back into the reactor. Approximately one-half of this being added prior to the addition of the catalyst and the other one-half after the addition of the catalyst. The catalyst added was 1.12 lb. of tetrabutyl titanate (DuPont's Tyzor TBT, essentially pure tetrabutyl titanate). The reactor was heated up and maintained at 177° C. for 24 hours with a slight nitrogen flow to sweep out methanol formed during the transesterification reaction period. At the end of the 24 hour period nitrogen flow was increased with the temperature remaining unchanged so as to strip out unreacted methyl 3-mercaptopropionate. The resulting poly(alkylene)-polyester-poly(sulfide)-polythiol possessed 0.87 weight percent mercaptan sulfur and a viscosity of 6400 centipoises at 25° C. and an acid number of 0.00. The product was obtained in amount of 3180 lbs.

EXAMPLE VIII

Into a 2 liter stirred, heated glass reactor was added 550 grams of polyether polyol (LHT-34). Nitrogen was bubbled through the stirred reactor at 0.057 m³/hr and the contents maintained at 100° C. for 1 hour to remove residual water. The nitrogen flow was then reduced to 0.0057 m³/hr, and a reflux condenser attached. A 65/35 ratio of pure methyl mercaptopropionate and pure dimethyl thiodipropionate (37.7 gram mixed ester) was added to the reactor. The catalyst was 0.2 mole tetrabutyl titanate (Tyzor TBT). The stirred reaction mixture was maintained at nitrogen flow C. for 24 hours. The nitrogen flow through the reaction mixture swept out the methanol formed in the transesterification reaction. At the end of the 24 hour period, the reflux condenser was removed and the nitrogen flow rate was increased to 0.057 m³/hr with the temperature maintained at 177° C. for 0.5 hour to remove volatiles. The resultant poly(oxyalkylene)-polyester-poly(monosulfide)-polythiol possessed 0.88 weight percent mercaptan sulfur and a viscosity of 4,800 centipoises at 25° C., and an acid number of 0.00 mg KOH per gram of sample.

This polymer was made into a sealant using the recipe of Example IV. The resulting properties after cure at 70° C. for 17 hours were as follows:

| | |
|---|---|
| 50 percent modulus, psi[1] | 28.5 |
| Tensile strength, psi[1] | 88.5 |
| Elongation, percent | >700 |

[1] = ASTM D 888-56T.

While this invention has been described in detail for the purpose of illustration, it is not to be construed as limited thereby but is intended to cover all changes and modifications within the spirit and scope thereof.

We claim:

1. A method of preparing a poly(oxyalkylene)-polyester-poly(sulfide)-polythiol having on the average more than two pendant thiol groups comprising reacting in the presence of a transesterification catalyst a mixture of
    (a) an alkyl mercaptocarboxylate of the formula HS$-(CR_2)_n-$COOR' wherein R' is an alkyl radical containing from 1 to 5 carbon atoms, wherein R is hydrogen or R', wherein n is an integer having a value of from 1 to 5 and wherein the total number of carbon atoms in all R groups is up to 15 carbon atoms per molecule; and
    (b) at least one dialkyl thiodicarboxylate of the formula R'OOC$-(CR_2)_n-S_r-(CR_2)_n-$COOR' wherein r is an integer of from 1 to 5, R, R', and n are as defined in (a) and wherein said dialkyl thiodicarboxylate contains a total of no more than 30 carbon atoms per molecule for all R groups; with (c) a poly(oxyalkylene)-polyol produced by reacting one or more epoxy-substituted hydrocarbons of the formula

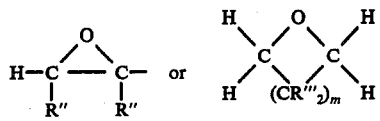

wherein R" is H or alkyl with the total number of carbon atoms in the molecule being up to 20 and wherein R'" is alkyl or H with the total number of carbon atoms per molecule being up to 20 and wherein m is an integer of from 1 to 10, with a polyol of the general formula Y(OH)$_x$ wherein Y is a hydrocarbon moiety with at least two carbon atoms per moiety and a valence equal to the value of x, x being an integer of at least two.

2. A method according to claim 1 wherein said poly(oxyalkylene)-polyester-poly(sulfide)-polythiol has at least 3 pendant thiol groups per polymer molecule.

3. A method according to claim 1 wherein a ratio of said mixture to said poly(oxyalkylene)-polyol is such that there is present from 1.0 to 1.1 equivalents of ester per equivalent of hydroxy group in said poly(oxyalkylene)-polyol.

4. A method according to claim 1 wherein said alkyl mercaptocarboxylate comprises methyl mercaptopropionate, said dialkyl thiodicarboxylate comprises dimethyl thiodipropionate, and said poly(oxyalkylene)-polyol is produced from 1,2,6-hexanetriol and propylene oxide.

5. A method according to claim 1 wherein said mixture is produced by reacting hydrogen sulfide with an olefinically unsaturated carboxylate of the formula CR$_2$ = CR$-(CR_2)_p$CO$_2$R' wherein p is zero or an integer having the value of 1, 2 or 3 and wherein R and R' are as defined in (a) and the total number of carbon atoms in all of the R groups is up to 15 carbon atoms per molecule.

6. A method according to claim 5 wherein a ratio of said mixture to said poly(oxyalkylene)-polyol is such that there is present from 1.0 to 1.1 equivalents of ester per equivalent of hydroxy group in said poly(oxyalkylene)-polyol.

7. A method according to claim 5 wherein said alkyl mercaptocarboxylate comprises methyl 3-mercaptopropionate, said dialkyl thiodicarboxylate comprises dimethyl thiodipropionate, and said poly(oxyalkylene)-polyol is produced from 1,2,6-hexanetriol and propylene oxide.

8. A method according to claim 1 wherein the transesterification catalyst is represented by the formula M(OR"")$_4$ wherein R"" is a 1–10 carbon atom alkyl group and M is titanium or zirconium.

9. A method according to claim 1 wherein said transesterification catalyst is tetrabutyl titanate.

10. A polymer prepared by the method of claim 1.

11. A sealant comprising the polymer of claim 10 plus a filler and a curing agent.

12. A method of preparing a poly(oxyalkylene)-polyester-poly(sulfide)-polythiol having at least 2 pendant thiol groups comprising:

reacting hydrogen sulfide with an olefinically unsaturated carboxylate of the formula

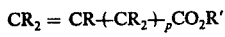

wherein R' is an alkyl radical containing from 1 to 5 carbon atoms, R is hydrogen or R', $p$ is zero or an integer having the value of 1, 2 or 3, and wherein the total number of carbon atoms in all of said R groups is up to 15 carbon atoms per molecule to produce a mixture of alkyl mercaptocarboxylate of the formula

wherein all R groups contain a maximum of 15 carbon atoms per molecule and $n$ is an integer of from 1 to 5, and wherein R and R' are as defined above and a dialkyl thiodicarboxylate of the formula

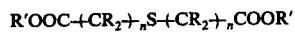

wherein R, R' and $n$ are as defined above and wherein the total number of carbon atoms in the R groups is up to 30 per molecule;

fractionally distilling said mixture to give a fraction enriched in said alkyl mercaptocarboxylate and a fraction enriched in said dialkyl thiodicarboxylate;

recombining the resulting enriched fractions in an amount so as to give 50 to 75 weight percent alkyl mercaptocarboxylate based on the total weight of alkyl mercaptocarboxylate and dialkyl thiodicarboxylate; and reacting the resulting combined mixture in the presence of a transesterification catalyst with a poly(oxyalkylene)-polyol produced by reacting one or more epoxy-substituted hydrocarbons of the formula

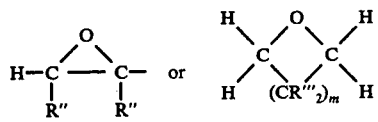

wherein R" is either H or alkyl with the total number of carbon atoms in all R" groups being up to 20 per molecule, wherein R''' is alkyl or H with the total number of carbon atoms per molecule in all R''' groups being up to 20 carbon atoms per molecule and wherein $m$ is an integer of from 1 to 10 with a polyol of the formula

wherein Y is a hydrocarbon moiety with at least two carbon atoms and a valence equal to the value of $x$, $x$ being an integer of at least two.

13. A method according to claim 12 wherein said combined mixture of alkyl mercaptocarboxylate and dialkyl thiodicarboxylate is present in an amount sufficient to give 1.0 to 1.1 equivalents of ester groups per equivalent of hydroxy group in said poly(oxyalkylene)-polyol.

14. A method according to claim 12 wherein said olefinically unsaturated carboxylate is methyl acrylate and said poly(oxyalkylene)-polyol is produced by reacting 1,2,6-hexanetriol and propylene oxide.

15. A method according to claim 12 wherein said transesterification catalyst is represented by the formula M(OR'''')$_4$ wherein R'''' is a 1-10 carbon atom alkyl group and M is titanium or zirconium.

16. A method according to claim 12 wherein said transesterification catalyst is tetrabutyl titanate.

17. A method according to claim 12 wherein said hydrogen sulfide and said olefinically unsaturated carboxylate are reacted in the presence of a basic addition catalyst.

18. A method according to claim 17 wherein said addition catalyst is ammonium hydroxide.

19. A composition produced by the method of claim 12.

20. A sealant comprising the composition of claim 19 plus a filler and a curing agent.

21. A method of preparing a poly(oxyalkylene)-polyester-poly(sulfide)-polythiol having on the average more than two pendant thiol groups comprising:

reacting hydrogen sulfide with methyl acrylate in the presence of an ammonium hydroxide catalyst to give a mixture comprising methyl 3-mercaptopropionate and dimethyl thiodipropionate; and reacting, in the presence of a transesterification catalyst comprising tetrabutyl titanate, the thus produced mixture with a poly(oxyalkylene)-polyol produced by reacting 1,2,6-hexanetriol and propylene oxide.

22. Poly(oxyalkylene)-polyester-poly(monosulfide)-polythiol characterized by undergoing no significant change in viscosity on storage for 60 days in air at room temperature.

23. A poly(oxyalkylene)-polyester-poly(sulfide)-polythiol characterized by undergoing no significant change in viscosity on storage for 60 days in air at room temperature.

24. A poly(oxyalkylene)-polyester-poly(sulfide)-polythiol having an acid number of less than 0.01.

25. A composition according to claim 24 wherein said acid number is 0.00.

26. A composition according to claim 24 wherein said poly(oxyalkylene)-polyester-poly(sulfide)-polythiol comprises poly(oxyalkylene)-polyester-poly(monosulfide)-polythiol.

* * * * *

UNITED STATES PATENT AND TRADEMARK OFFICE
CERTIFICATE OF CORRECTION

PATENT NO. : 4,113,707
DATED : September 12, 1978
INVENTOR(S) : Rector P. Louthan and Richard C. Doss It is certified that error appears in the above-identified patent and that said Letters Patent are hereby corrected as shown below:

Column 3, line 56, the formula " 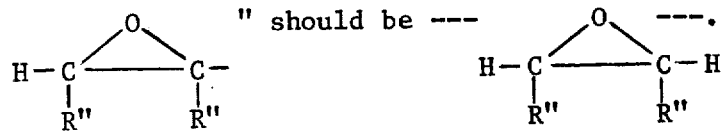 " should be --- 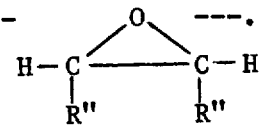 ---.

Column 14, line 5, the formula " 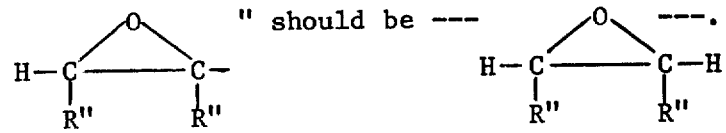 " should be --- 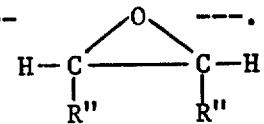 ---.

Column 15, line 42, the formula " 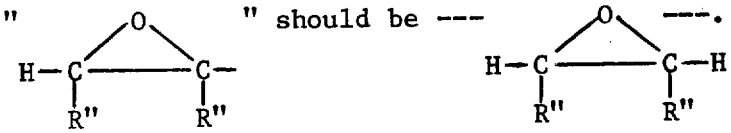 " should be --- 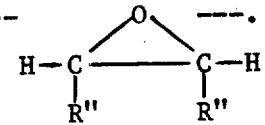 ---.

Signed and Sealed this

Tenth Day of April 1979

[SEAL]

Attest:

RUTH C. MASON
Attesting Officer

DONALD W. BANNER
Commissioner of Patents and Trademarks